United States Patent Office 3,364,177
Patented Jan. 16, 1968

3,364,177
CURING EPOXY RESINS WITH AMINO-METHYLATED DIPHENYL OXIDES
Bart J. Bremmer, Midland, Mich., assignor to The Dow Chemical Company, Midland, Mich., a corporation of Delaware
No Drawing. Filed Feb. 21, 1966, Ser. No. 528,768
2 Claims. (Cl. 260—47)

This invention relates to improved epoxy resin compositions which may be cured at room temperature. More particularly, it relates to curing epoxy resin compositions using aminomethylated diphenyl oxides as curing agents.

Epoxy resins can be cured at room temperature using such curing agents as diethylenetriamine and triethylenetetramine. However, the pot life of such curing agents is limited, and, in addition, the exotherm from the reaction is undesirably high which often results in charring or discoloration of the epoxy resin being cured. Further, such prior known curing agents are characterized by a relatively low vapor pressure and, as a result, use of such materials often causes severe skin irritation as well as the development of bubbles in the cured epoxy resin.

It has now been discovered, which discovery forms the instant invention, that utilization of aminomethylated diphenyl oxides of the following general formula:

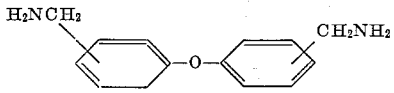

as curing agents for epoxy resins, alleviates the disadvantages of the prior known room temperature curing agents. More particularly, it has been found that use of such materials as curing agents for epoxy resins increases the pot life of the resin mixture by a factor of about 3; lowers the exotherm peak temperature by about 60–70° C. (measured using 50 gram samples of curable resin); provides lighter colored castings of cured epoxy resins with little or no evidence of bubbles; has less tendency to cause undesirable skin irritation and, in addition, allows the curing, at ambient temperature, of a wide range of highly reactive epoxy resins. Further, utilization of such aminomethyldiphenyl oxide curing agents does not adversely affect the physical properties, e.g., heat distortion and the like, of the cured epoxy resins.

The aminomethyldiphenyl oxide curing agents of the present invention are thin liquids or low melting solids which may comprise a mixture of isomers and analogs, but which are characterized by the hereinbefore specified general formula, i.e., have an average aminomethyl functionality of about two. Such materials are prepared by conventional procedures as, for example, by the techniques described in U.S. 2,640,080.

Among the epoxy resins which may be cured with the curing agents specifically described herein are the polyglycidyl derivatives of (1) dihydric phenols; (2) alkyl-substituted dihydric phenols; (3) halogen-substituted dihydric phenols; (4) bisphenols represented by the formula:

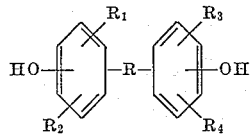

where R is selected from the group consisting of alkylene,

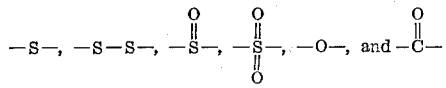

and wherein $R_1$, $R_2$, $R_3$ and $R_4$ are independently selected from the group consisting of hydrogen and halogen; (5) polyoxyalkylene glycols; and (6) the condensation products of formaldehyde and phenol, alkyl-substituted phenols or halogen-substituted phenols.

Various amounts of the aminomethyldiphenyl oxide curing agents may be used to cure the epoxy resins. Generally, such curing agents are used in amounts of from 20 to 50 parts by weight per 100 parts of epoxy resin, although substantially equivalent amounts, based on the epoxy resin to be cured, are generally preferred.

The epoxy resin and curing agents are combined by simply admixing the two together at room temperature or at temperatures only slightly above room temperature, i.e., a temperature up to about 60° C. Additional materials, such as fillers; pigments; fibers; dyes; plasticizers; peroxides, such as benzoyl peroxide; accelerators, such as triphenyl phosphite; and the like, can be added to the curable epoxy resins if desired.

Methods of preparing the compositions of the present invention and illustration of desirable and unexpected utility thereof, are illustrated in the following examples.

Example 1

To 50 grams of an epoxy resin comprising a diglycidyl ether of 2,2-bis(4-hydroxyphenyl)propane having an epoxide equivalent weight of from 186 to 192 and a viscosity of 11,000–14,000 cps. at 35° C. was added at normal room temperature (about 25° C.), a stoichiometric amount (18 grams) of an aminomethylated diphenyl oxide prepared by reaction of a molar excess of anhydrous ammonia and chloromethylated diphenyl oxide having a chlorine content of about 27.3 percent and an approximate isomer distribution as follows:

| | Percent |
|---|---|
| Unreacted diphenyl oxide | 0.7 |
| Mono-o-chloromethylated diphenyl oxide | 1.2 |
| Mono-p-chloromethylated diphenyl oxide | 6.9 |
| o,p-Dichloromethylated diphenyl oxide | 22.9 |
| p,p-Dichloromethylated diphenyl oxide | 46.1 |
| Trichloromethylated diphenyl oxide | 18.3 |
| Tetrachloromethylated diphenyl oxide | 1.9 |

Such material was a thin liquid having the following "average" structure:

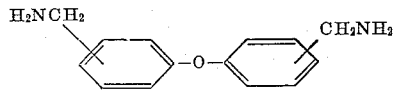

Mixing of the epoxy resin and curing agent was commenced at about 25° C., and the reaction temperature recorded up to peak exotherm.

This material is hereinafter referred to as Sample No. 1.

In a separate reaction, 50 grams of the epoxy resin described herein were admixed by like procedure with a stoichiometric amount of an aminomethylated diphenyl oxide curing agent having the structure:

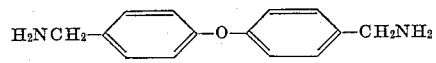

which curing agent was prepared by reaction of a molar excess of anhydrous ammonia and 4,4'-dichloromethyl diphenyl oxide.

Mixing of the epoxy resin and curing agent, and observation and recording of the reaction temperature, were accomplished as hereinbefore described. This material is hereinafter referred to as Sample No. 2.

For purposes of comparison, individual 50 gram samples of the herein-described epoxy resin were separately admixed, at room temperature, with stoichiometric amounts of diethylenetriamine and triethylenetetramine, respectively, and the reactions referred to as comparative Samples No. 3 and 4.

The following Table I illustrates: the peak exotherm temperature for each resin mixture; the shelf life of each mixture as a measure of the time elapsed from beginning of mixing of the epoxy resin and the curing agent up to peak exotherm (which time essentially coincides with the gel time for the curable epoxy resins); and, the visual appearance of the cured resins.

TABLE I

| Curing Agent | Shelf Life, min. | Peak Exotherm Temp., °C. | Visual Appearance of Cured Resin |
|---|---|---|---|
| This Invention: | | | |
| (1) Aminomethylated diphenyl oxide. | 93 | 164 | Light brown with almost no bubbles. |
| (2) Aminomethylated diphenyl oxide. | 65 | 176 | Light yellow with almost no bubbles. |
| For Comparison: | | | |
| (3) Diethylenetriamine. | 30 | 235 | Light brown, many bubbles. |
| (4) Triethylenetetramine. | 32 | 224 | Do. |

The following Table II illustrates heat distortion properties of cured epoxy resin mixtures prepared by room temperature reaction of stoichiometric amounts of the individual curing agents with 186 gram samples of the epoxy resin herein described. Results were obtained following cure schedules of 4, 7 and 14 days at room temperature as well as for samples cured at 100° C. for periods of one and two hours.

TABLE II

| Curing Agent | Amt. (grams) | Heat Distortion Temp. °C. | | | | |
|---|---|---|---|---|---|---|
| | | Room Temp. Cure | | | 100° C. Cure | |
| | | 4 days | 7 days | 14 days | 1 hr. | 2 hrs. |
| This Invention: | | | | | | |
| (1) Aminomethylated diphenyl oxide | 66 | 67 | 63 | 68 | 95 | 108 |
| (2) Aminomethylated diphenyl oxide | 61 | 67 | 64 | 66 | 91 | 101 |
| For Comparison: | | | | | | |
| (3) Diethylenetriamine | 20.7 | 69 | 67 | 68 | 95 | 102 |
| (4) Triethylenetetramine | 24.4 | 69 | 70 | 69 | 90 | 99 |

Reference to the data of Tables I and II illustrates that the aminomethylated diphenyl oxides provide significantly improved shelf life, lower peak exotherm and reduced bubble formation in the cured epoxy resins, when used as curing agents as contemplated by the present invention, without adverse effect upon the heat distortion properties of the resulting cured resin.

*Example 2*

To individual 180 gram samples of an epoxy resin made from a condensation product of formaldehyde and phenol having an epoxide equivalent weight of from 175–182, a functionality of about 3.5, and a viscosity of about 19,000,000 cps. at 25° C. and 30,000–90,000 cps. at 52° C. were separately added stoichiometric amounts of the aminomethylated diphenyl oxide curing agents defined as Samples No. 1 and 2 in Example 1. Each mixture was then reacted at room temperature to obtain cured epoxy resins utilizing varying cure schedules. The following Table III illustrates the cure schedules employed and the heat distortion of the cured products obtained.

TABLE III

| Curing Agent | Heat Distortion, °C.—Room Temp. Cure | | | Cure at Elevated Temperatures | | | |
|---|---|---|---|---|---|---|---|
| | 4 days | 7 days | 14 days | 1 hr. at 100° C. | 2 hrs. at 100° C. | 2 hrs. at 100° C. + 1 hr. at 150° C. | 2 hrs. at 100° C.+ 1 hr. at 150° C. + 1 hr. at 175° C. |
| This Invention: | | | | | | | |
| (1) Aminomethylated diphenyl oxide | 61 | 64 | 73 | 119 | 117 | 138 | 140 |
| (2) Aminomethylated diphenyl oxide | 61 | 64 | 77 | 118 | 120 | | |

By way of comparison, it was found that diethylenetriamine and triethylenetetramine could not be used as room temperature curing agents for the described epoxy resin because of their excessive rate of cure during mixing with such epoxy resin.

Similar good results as specifically shown herein are obtained utilizing any of the epoxy resins and curing agents contemplated by the present invention. The curable resin mixtures of the present invention are suitable for use in preparing adhesives, reinforced plastics, coatings, potting compounds, and the like, and are particularly useful in casting applications for embedding electrical and electronic equipment, due to the fact that hard, thermoset materials can be made at room temperature wherein longer pot life and lower exothermic temperatures are achieved. Further, the exceptionally good pot life of these compositions may be of special advantage in filament winding applications.

What is claimed is:

1. Thermosettable epoxy resin mixtures capable of being cured at room temperature consisting essentially of (1) 100 parts by weight of an epoxy resin having a plurality of 1,2-epoxide groups per molecule, and (2) from about 20 to 50 parts by weight of an aminomethylated diphenyl oxide of the general formula:

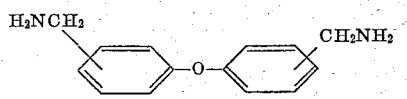

as a curing agent.

2. The resin mixture of claim 1 wherein said aminomethylated diphenyl oxide is present in substantially equivalent amounts based on the epoxy resin.

No references cited.

WILLIAM H. SHORT, *Primary Examiner.*

T. D. KERWIN, *Assistant Examiner.*